(12) United States Patent
DiOrio et al.

(10) Patent No.: US 9,591,834 B2
(45) Date of Patent: Mar. 14, 2017

(54) REMOVABLE SEED TRAY FOR A BIRD FEEDER

(71) Applicant: Aspects, Inc., Warren, RI (US)

(72) Inventors: Kenneth M. DiOrio, Warren, RI (US); Marco Wo, Providence, RI (US); Dana Chicca, Swansea, MA (US); Joseph Cacciola, Wrentham, MA (US)

(73) Assignee: ASPECTS, INC., Warren, RI (US)

( * ) Notice: Subject to any disclaimer, the term of this patent is extended or adjusted under 35 U.S.C. 154(b) by 114 days.

(21) Appl. No.: 14/727,180

(22) Filed: Jun. 1, 2015

(65) Prior Publication Data

US 2015/0342154 A1 Dec. 3, 2015

Related U.S. Application Data

(60) Provisional application No. 62/006,582, filed on Jun. 2, 2014.

(51) Int. Cl.
*A01K 39/014* (2006.01)
*A01K 39/012* (2006.01)

(52) U.S. Cl.
CPC .................. *A01K 39/012* (2013.01)

(58) Field of Classification Search
CPC .... A01K 39/014; A01K 39/01; A01K 39/012; A01K 5/0225
USPC ........ 119/52.2, 52.1, 57.8, 57.9, 51.01, 52.3, 119/53, 53.5, 54, 428, 429, 430, 431, 464, 119/61.5
See application file for complete search history.

(56) References Cited

U.S. PATENT DOCUMENTS

| | | | | |
|---|---|---|---|---|
| 1,584,536 A * | 5/1926 | Healy | .................. | A01K 39/026 119/77 |
| 1,815,964 A * | 7/1931 | Boyer | .................. | A01K 39/012 119/77 |
| 2,941,506 A * | 6/1960 | Fulton | .................. | A01K 39/012 119/52.1 |
| 4,829,934 A * | 5/1989 | Blasbalg | .............. | A01K 39/012 119/57.8 |
| 5,062,388 A * | 11/1991 | Kilham | ................ | A01K 39/012 119/52.2 |
| 5,558,040 A * | 9/1996 | Colwell | ............... | A01K 39/012 119/52.2 |
| 5,699,753 A * | 12/1997 | Aldridge, III | ....... | A01K 5/0225 119/52.1 |
| 5,782,200 A * | 7/1998 | Knowles | .............. | A01K 39/012 119/53 |
| 6,758,164 B2 * | 7/2004 | Rich | ..................... | A01K 39/012 119/52.3 |
| 6,957,626 B2 * | 10/2005 | Ela | ........................ | A01K 39/012 119/57.9 |
| 7,516,716 B2 * | 4/2009 | Puckett | ................ | A01K 39/012 119/432 |
| 7,621,232 B2 | 11/2009 | Bescherer | | |

(Continued)

*Primary Examiner* — Trinh Nguyen
(74) *Attorney, Agent, or Firm* — Barlow, Josephs & Holmes, Ltd.

(57) ABSTRACT

The removable seed tray is quickly and easily removable from a removable bird feeder base that is attached to the main tubular body of a bird feeder. The seed tray effectively serves the function of a seed tray while also permitting access to the portions of the removable base to permit the removable base to be detached from the tubular bird feeder body while the seed tray remains attached thereto.

6 Claims, 12 Drawing Sheets

(56) References Cited

U.S. PATENT DOCUMENTS

| | | | | |
|---|---|---|---|---|
| 7,721,676 B2* | 5/2010 | Bloedorn | ............. | A01K 39/012 |
| | | | | 119/57.8 |
| 7,827,936 B1* | 11/2010 | Puckett | ................ | A01K 39/012 |
| | | | | 119/52.2 |
| 9,210,913 B2* | 12/2015 | Evans | ................... | A01K 39/012 |
| 2005/0211177 A1* | 9/2005 | Bescherer | ............ | A01K 39/012 |
| | | | | 119/57.8 |
| 2014/0360435 A1* | 12/2014 | Cote | .................... | A01K 39/012 |
| | | | | 119/57.8 |
| 2015/0000602 A1* | 1/2015 | Colvin | ................ | A01K 39/014 |
| | | | | 119/51.01 |

* cited by examiner

REMOVABLE SEED TRAY FOR A BIRD FEEDER

CROSS-REFERENCE TO RELATED APPLICATION

This application is related to and claims priority from earlier filed provisional patent application Ser. No. 62/006,582, filed Jun. 2, 2014 the entire contents thereof is incorporated herein by reference.

BACKGROUND OF THE INVENTION

1. Field of the Invention

The present invention generally relates to bird feeders, namely, tubular bird feeders. More specifically, the present invention relates to bases for such tubular bird feeders.

2. Background of the Related Art

In the bird feeder industry, tubular bird feeders are very well known. These feeders include a tubular main feed body, which is commonly transparent or translucent so the amount of feed remaining therein can be easily seen. Feed ports in the tubular body permit birds to gain access to the feed therein. A tubular bird feeder also typically includes a number of perches routed through or attached to the tubular body to support a bird during feeding through one of the feed ports.

A tubular bird feeder typically has an open top and bottom end. The top end is covered by a removable cap so feed may be introduced into the tubular body. Bail wires are also provided so the feeder can be hung from a support. The bottom of the main tubular body is also closed, typically permanently, by a bottom base or cap. This base is usually screwed on or riveted to the bottom of the tubular main body to keep it closed. A post mount can be provided in the bottom of the bottom cap. The bases of prior art tubular bird feeders usually extend up into the tubular body. The top surface of the base of the feeder is commonly tapered or angled in some fashion to direct feed toward one or more of the feed ports at the lowermost portion of the tubular main body. This ensures that birds can gain access to all of the feed within the tubular feeder.

These known tubular feeders suffer from various problems that make them difficult to maintain. Remaining amounts of feed typically accumulate at the bottom of the feeder. When this feed mixes with rain, and the like, the feed at the lower portion of the feeder becomes packed and dirty making it difficult, if not impossible, for birds to access it. Moreover, once the feed is wet and/or dirty, birds may not even wish to consume it. Since the bases of these known tubular feeders are secured to the bottom of the feeder, they are difficult to remove. If a base is permanently secured to the bottom of the feeder, it will not be able to be removed. More likely, threaded fasteners are used to secure the base to bottom of the tubular main body. These fasteners require tools, such as a screwdriver or wrench, to remove the base for cleaning the feeder. The requirement of tools increases the burden of cleaning a feeder and further makes a bird feeder owner less likely to clean their feeder.

Therefore, there is a need for a bird feeder to be able to be quickly and easily cleaned. There is a specific need for an easily removable base for easy access to the bottom of the feeder. A bird feeder with a removable base that meets these needs is provided in U.S. Pat. No. 7,621,232, which is commonly owned with the present application. This bird feeder with such an easily removable base without tools provides a solution to the problems associated with prior art tubular bird feeders. This prior art bird feeder includes a base that is quickly and easily removable from the bottom of the main tubular body of the feeder. In general, the prior art feeder provides a new base that is releasably secured to the bottom of the feeder.

More specifically, the prior art feeder includes a tubular body member having an open bottom end where the base member is interfittingly engaged with the bottom end of the tubular body member. The base member is releasably secured to the tubular body member by the engagement of a spring-biased pin that communicates with an aperture through the wall of the tubular body member. Preferably, there are two spring-biased locking pins on opposing sides of the feeder with corresponding lock eye apertures. User manipulatable buttons are linked to the locking pins to cause them to retract to permit releasable attachment of the tubular body member of the feeder thereon.

Further, there is also a well-known desire to provide a seed tray proximal to a bird feeder to catch any seeds, shells or other debris that might fall from the feeder. This helps avoid such material from accumulated below the feeder to keep the area near the feeder neat and clean. Such a seed tray is typically fixedly secured to the bottom of the base of a bird feeder, for example, by a threaded interconnection. However, if such a seed tray is fixed secured directly to the bottom of the removable base of the prior art feeder discussed above, it would be difficult for the user to gain access to the squeeze buttons to release the base of the feeder for cleaning. Further, it would be difficult to clean the base of the feeder and the surrounding parts of the feeder if a seed tray is fixed secured to the base of a feeder.

Therefore, there is a need for seed tray that can be easily installed and removed from the base of a bird feeder while also providing an easily removable base for the feeder.

There is a further need for a seed tray that is compatible with a removable base where the removable based can be removed while the seed tray is still attached thereto.

SUMMARY OF THE INVENTION

The present invention provides a solution to the problems associated with prior art tubular bird feeders. The bird feeder of the present invention includes a new and novel removable seed tray that is quickly and easily removable from the base that is attached to the main tubular body of the feeder. In general, the present invention provides a new removable seed tray that is releasably secured to a removable base of the feeder.

More specifically, the present invention includes a substantially planar member with a, for example, pair of button receiving members to receive the squeeze buttons of the removable base of a bird feeder. The button-receiving members include a dome-like structure to ensure collection of bird feeder debris even in the regions of where the button-receiving members are located. A seat is provided to receive a removable base of a feeder. Each of the button receiving members preferably include a chamfered or beveled surface to facilitate insertion of the base into its seat and to permit the squeeze buttons to ride into their respective button receiving housing so that the seed tray may be removably attached to the removable bird feeder base.

An object of the present in invention is to provide a seed tray that can be easily installed onto and removed from a bird feeder base, such as a removable bird feeder base.

Another object of the present invention is to provide a removable seed tray that permits removal of a removable base from the bottom of a bird feeder while the seed tray is still installed thereto.

BRIEF DESCRIPTION OF THE DRAWINGS

These and other features, aspects, and advantages of the present invention will become better understood with reference to the following description, appended claims, and accompanying drawings where:

DESCRIPTION OF THE INVENTION

Figure 1:
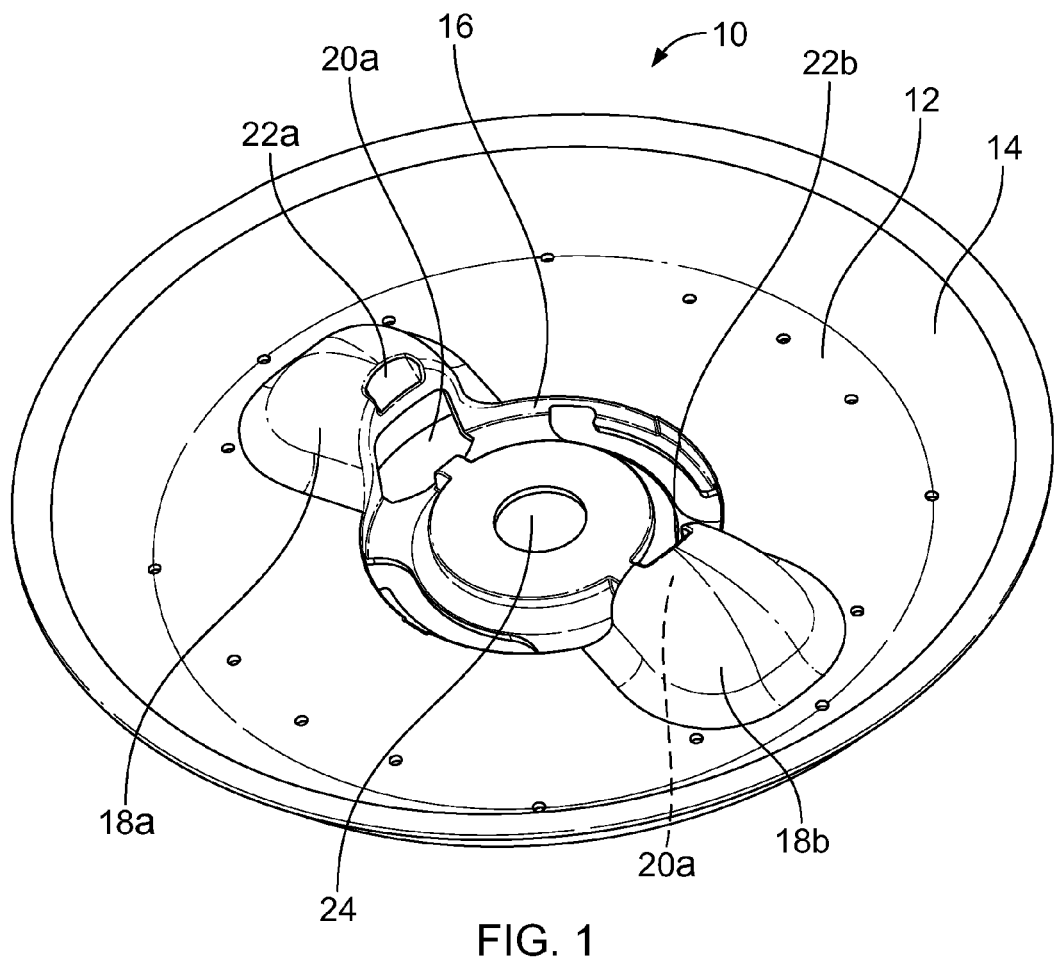
FIG. 1 is a perspective view of the seed tray of the present invention.

Referring to FIGS. 1-5, the seed tray 10 of the present invention is shown in detail. The seed tray 10 is of a general construction of a typical seed tray in that it includes a floor 12 and a wall 14 upstanding from the periphery thereof. In the figures herein, the upstanding wall 14 is shown as curved but it should be understood that any type of peripheral wall can be used.

A center base-receiving seat 16 is provided in the middle of the seed tray 10 of the present invention. Structures may be provided in the seat 16 to grip onto the periphery of a removable base, as will be discussed in detail below. At least one, preferably two, dome-like members 18a and 18b are provided on, namely integrated into, the seed tray 10. The dome-like members 18a and 18b are preferably projections up from the floor 12 of the seed tray 10. Preferably the dome-like members 18a and 18b are integrally formed with the entire seed tray 10 from a unitary mold (not show).

Figure 6:
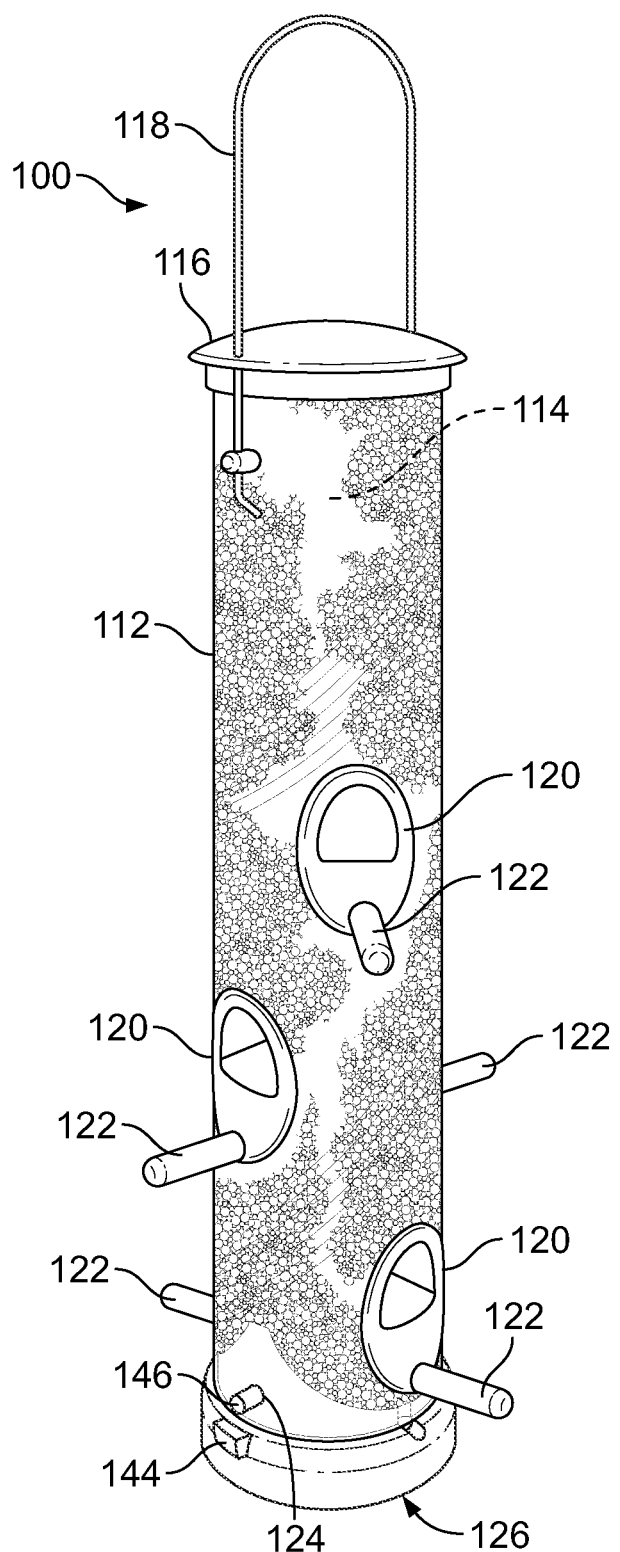
FIG. 6 is a perspective view of a prior art bird feeder with a removable base.
Figure 7:
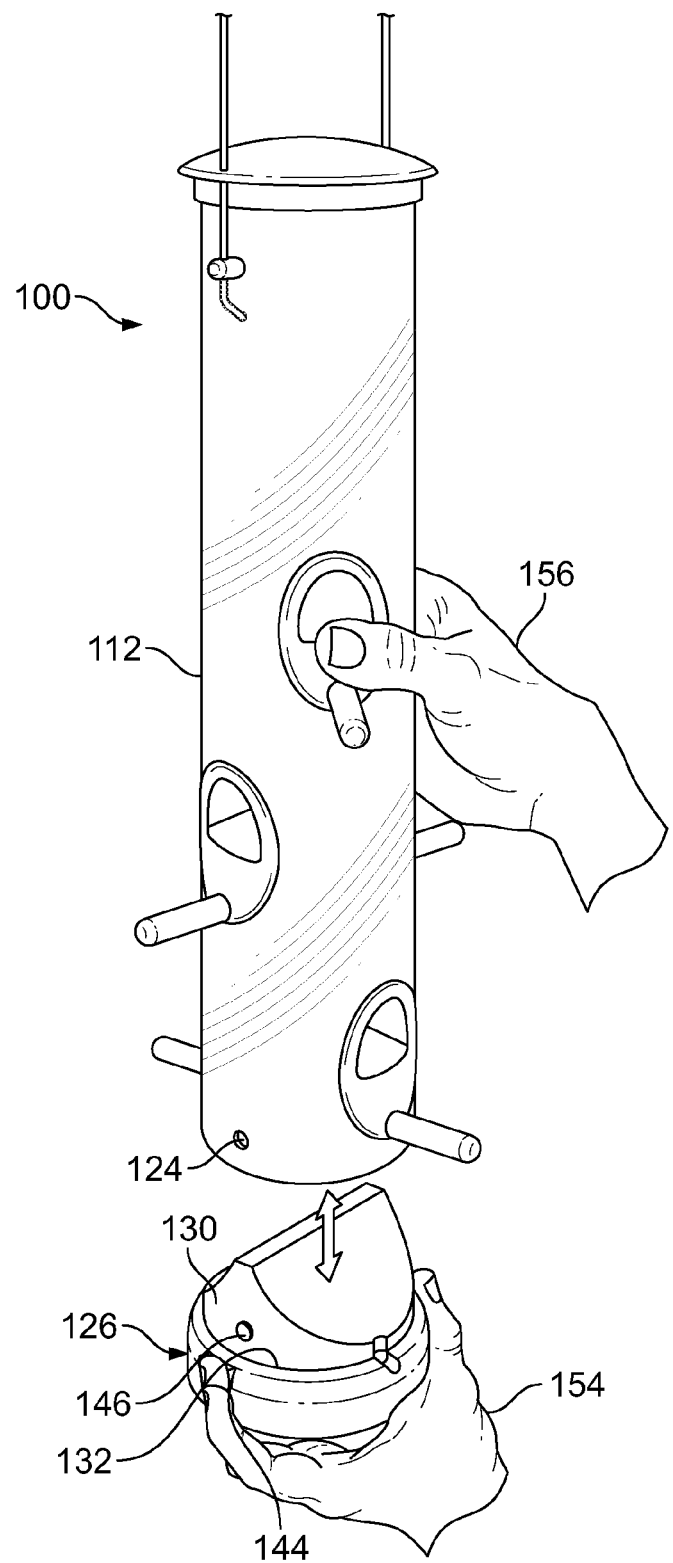
FIG. 7 is a perspective of the bird feeder of FIG. 6 with the removable base in the process of being removed.

Referring briefly to FIGS. 6 and 7, a feeder 100 equipped with the easily removable base 126 of the prior art feeder of U.S. Pat. No. 7,621,232 is shown in detail. The feeder 100 includes a main tubular member 112 with a number of feed ports 120 and perches 122 where bird feed 114 is stored therein. The feeder 100 also includes a top cap 116 and a bail wire 118 for hanging thereof. The base 126 of the feeder includes a pair spring biased pins 146, preferably on opposing sides of the feeder 100 (only one side is visible in FIGS. 6 and 7), that releasably connect and pass through holes 124 in the tubular member 112. The pins 146 are spring-biased outwardly and are mechanically linked to buttons 144. In FIG. 6, the pins 146 are spring-biased outwardly an in engagement with the main tubular member to secure the removable base 126 in place. When the buttons 144 are depressed, as in FIG. 7, the pins 146 retract thereby clearing the respective holes 124 to permit the base 126 to be separated from tubular member 112 for cleaning.

Referring back to FIG. 1, the lateral apertures 20a and 20b receive the portions, namely, the spring-biased buttons 144, of the removable base 126 that need to be depressed inwardly so that the removable base 126 can be removed from the main tubular body 112 of the feeder. Details of the communication of the seed tray with the tubular feeder will be shown in detail below. The domes 18a and 18b maintain the integrity and structure of the seed tray 10 so that falling debris, such a feed, will still be directed to the floor 12 of the seed tray 10. A top portion of each of the dome-like members 18a and 18b respectively includes an inwardly directed solid chamfered edge surface 22a and 22b to help direct the buttons of the removable base into their respective lateral apertures 20a and 20b, which will be discussed in detail below. Open bottom ends of the dome-like members 18a and 18b enable the fingers of a user 156 to access the buttons 144 of the removable base 126 to manipulate them through the lateral apertures 20a and 20b, namely, depress them so the base 10 can be removed while the base 126 of the feeder 100 is still connected.

A central aperture 24 is provided in the seed tray 10 to enable accessories to be mounting to the removable base 126 of the bird feeder 100. For example, the removable base 126 may include a female threaded aperture to receive a male threaded post for post mounting of the feeder with the seed tray 10 of the present invention installed. Details of a construction for post mounting a bird feeder to a post are so well known in the art they need not be discussed in further detail.

Figure 2:
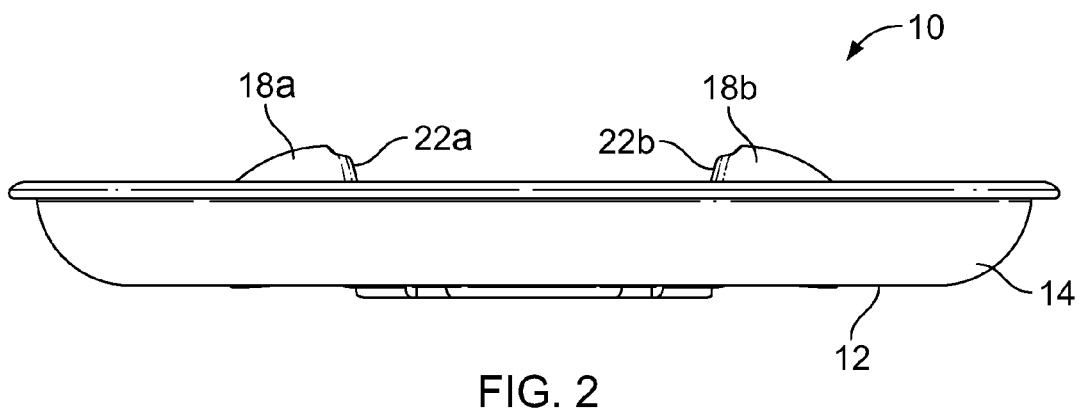
FIG. 2 is a side view of the seed tray of FIG. 1.
Figure 3:
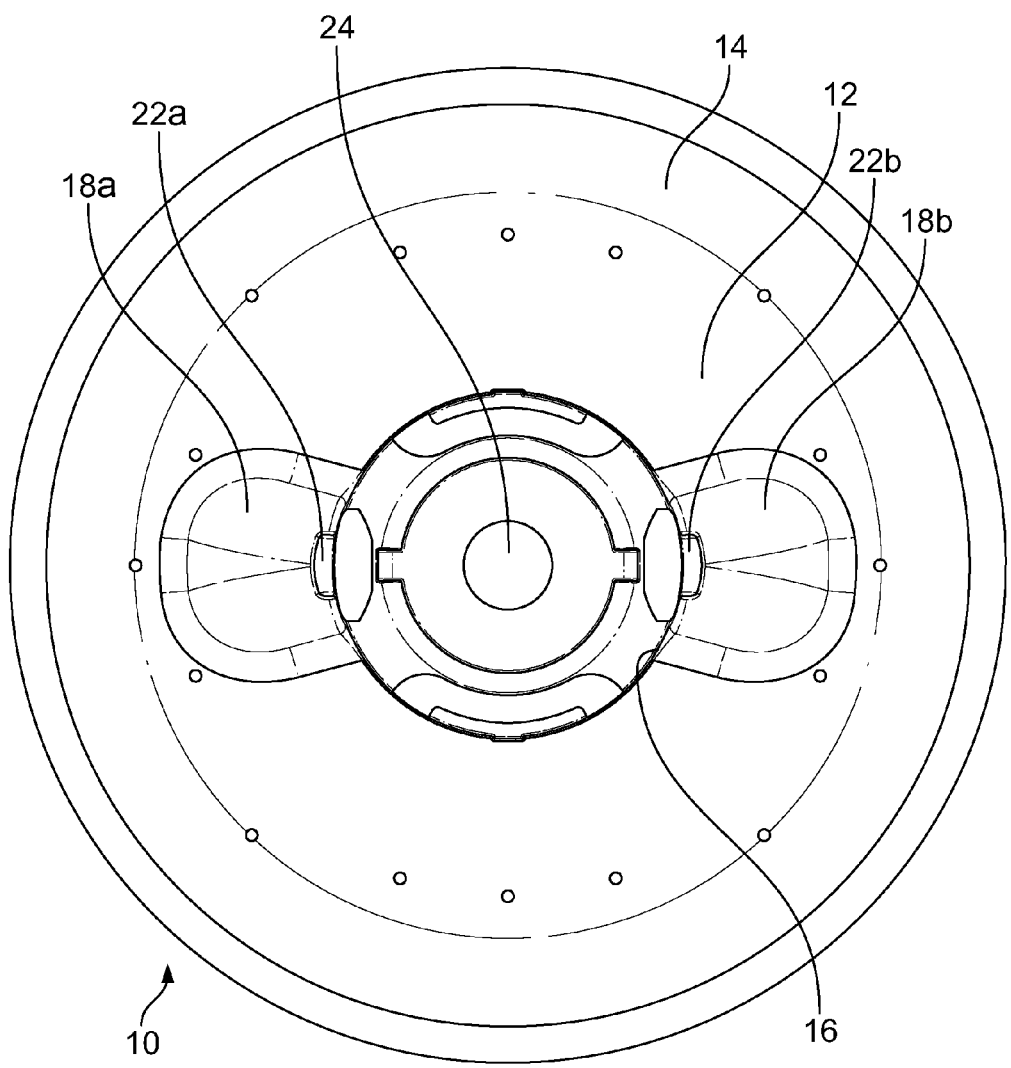
FIG. 3 is a top view of the seed tray of FIG. 1.
Figure 4:
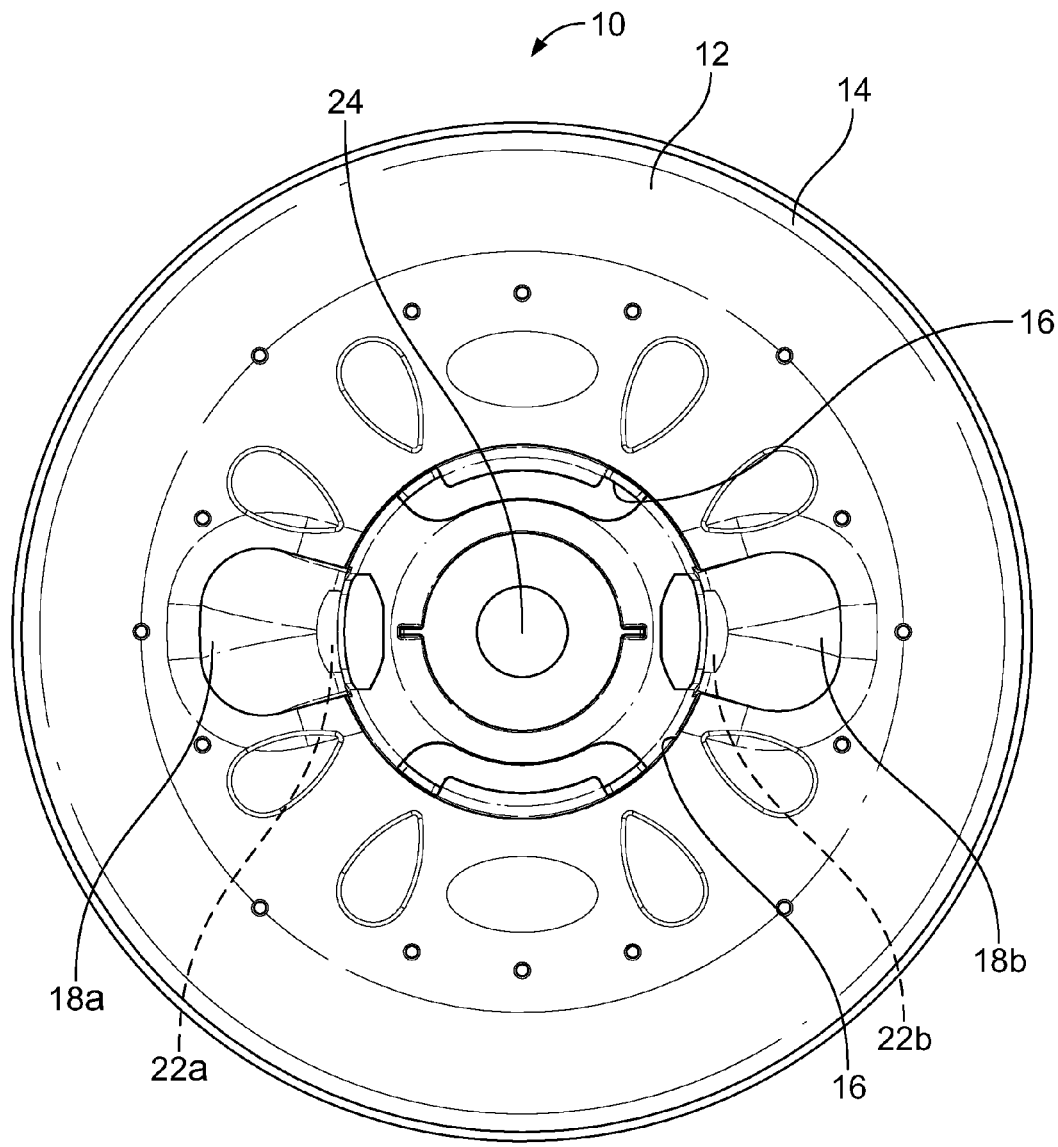
FIG. 4 is a bottom view of the seek tray of FIG. 1.
Figure 5:
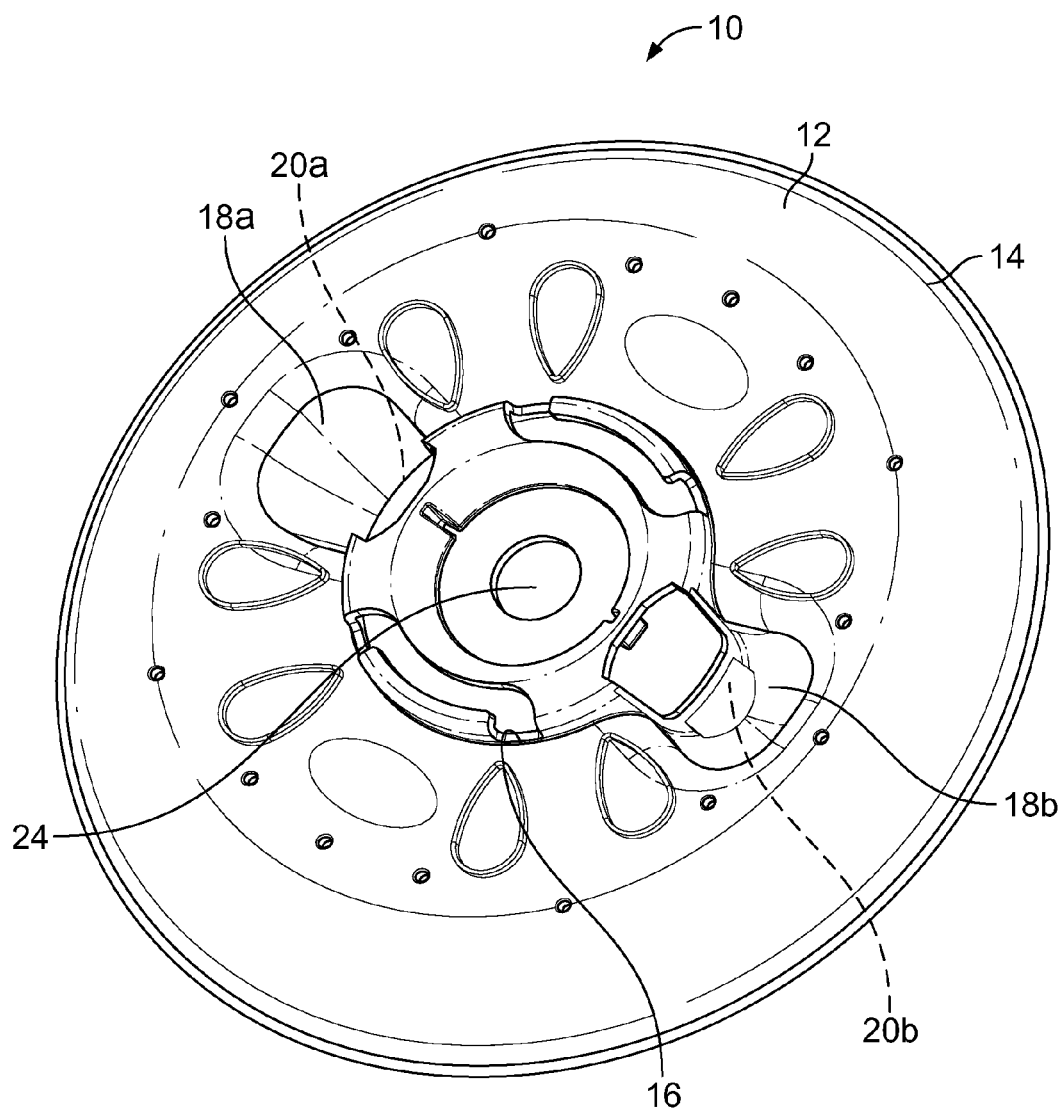
FIG. 5 is a bottom perspective view of the seed tray of FIG. 1.

FIG. 2 shows a side elevational view of the seed tray 10 of the present invention where it can be seen that the dome-like members 18a and 18 include their respective chamfered surfaces 22a and 22b for receipt and engagement of buttons 144 of the removable base 126 of the feeder 100. FIG. 3 is a top view of the seed tray 10 of the present invention where the layout of the dome-like members 18a and 18b with the receiving seat 16 for the removably base 126. FIGS. 4 and 5 show a bottom view and a bottom perspective view of the seed tray 10 of the present invention. The structure of the dome-like members 18a and 18b can be clearly seen to define a cavity or opening from below that is large enough for a user to 156 to insert their fingers therein and be able to manipulate the buttons 144 for removal of the removable base 126.

Figure 8:
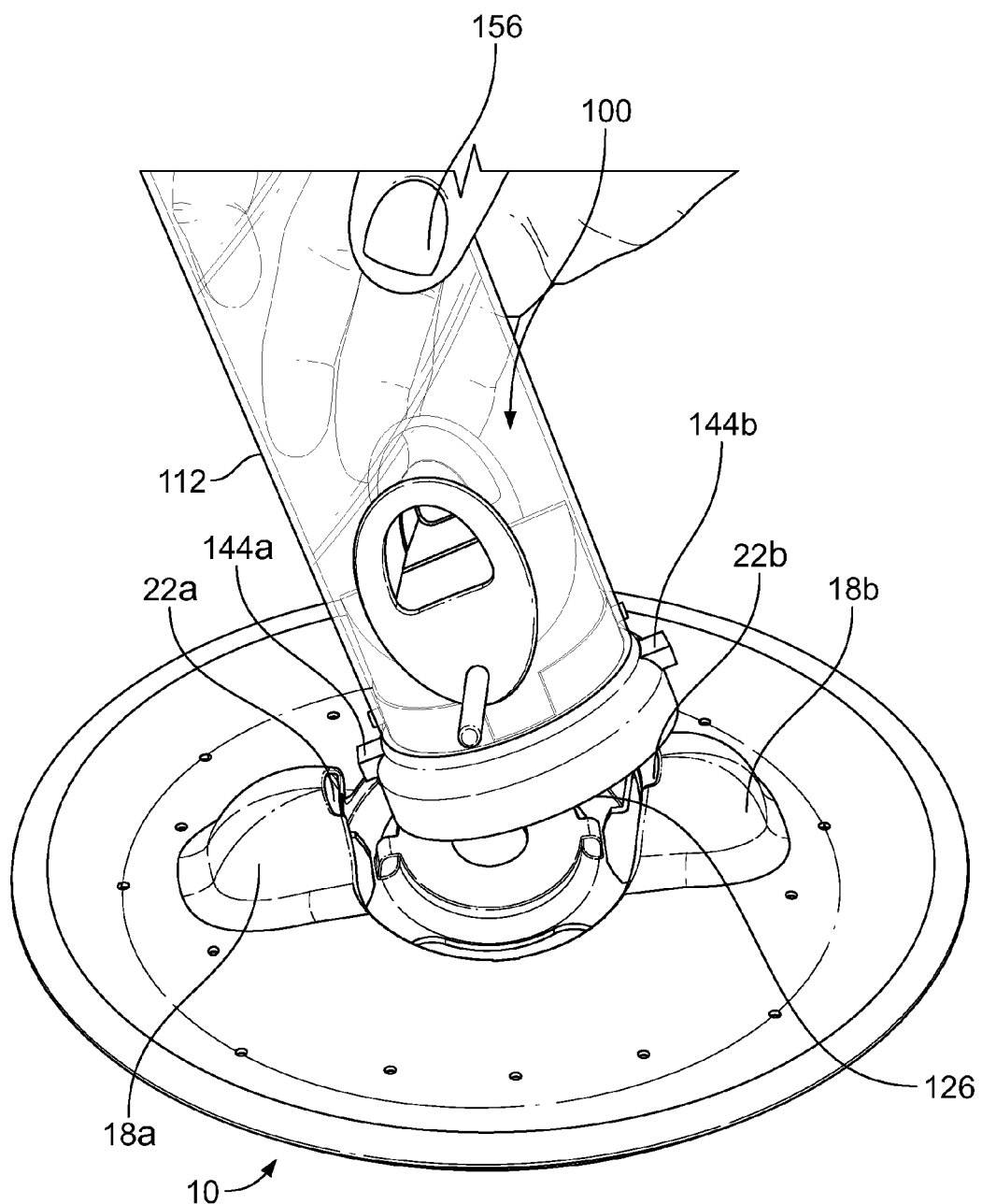
FIG. 8 shows the seed tray of FIG. 1 being installed onto the removable base of the feeder of FIG. 6.

FIG. 8 shows a first step of installation of the seed tray 10 of the present invention to the feeder 100, namely, to the removable base 126. The removable base 126 is already installed to the bottom of the feeder 100, as seen in FIG. 6. The feeder 100 is held by the user 156 and is brought closer to the seed tray 10 where the buttons 144a and 144b on the removable base 126 are aligned with the dome-like members 18a and 18b respectively.

Figure 9:
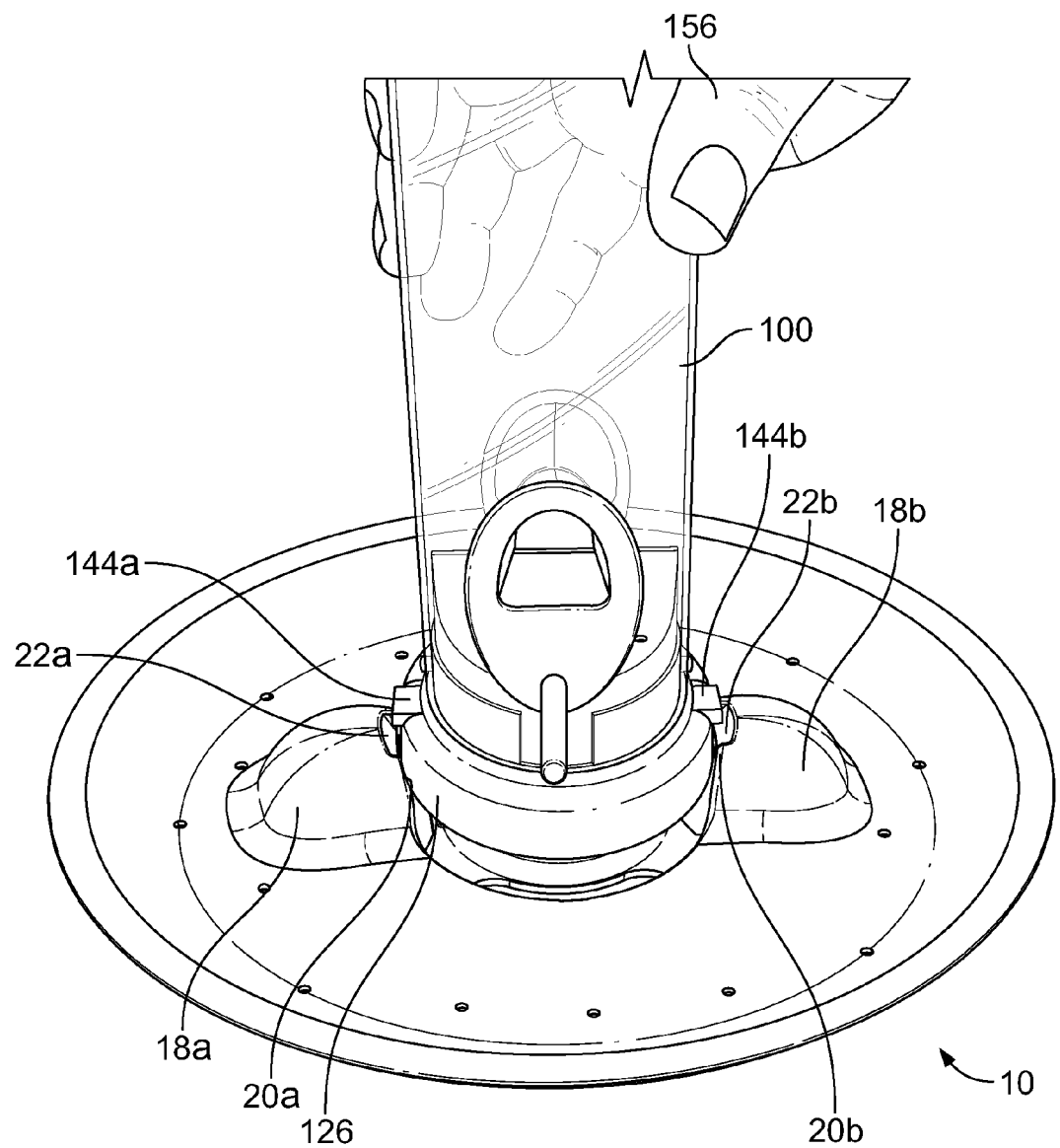
FIG. 9 shows the seed tray receiving the base of the bird feeder.
Figure 10:
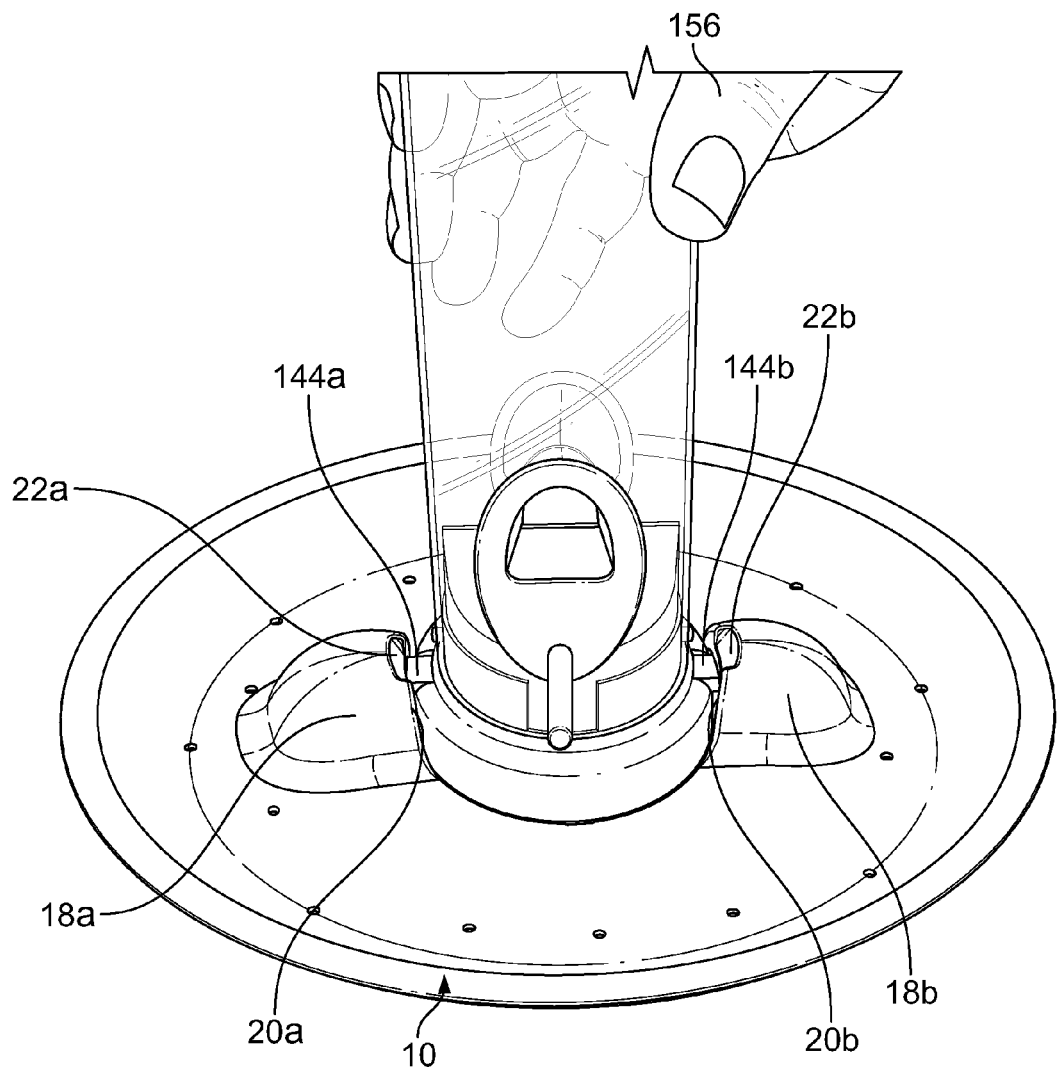
FIG. 10 shows the seed tray fully installed onto the base of the feeder.

In FIG. 9, the spring-loaded buttons 144a and 144b are pushed down into communication with the chamfered edge surfaces 22a and 22b at the top of each dome-like member 18a and 18b. Pushing further down causes the buttons 144a and 144b to retract against the spring-biasing forces discussed above and then release when they clear into their respective lateral apertures 20a and 20b, which can be seen in FIG. 10. Now, the seed tray 10 of the present invention is installed to the removable base 126 and can be used normally. The outwardly extended buttons 144 within the lateral apertures 20a and 20b prevent easy separation of the seed tray 10 from the removable base 126. The seat 16 of the seed tray 10 can be equipped with additional structures such as inwardly facing tabs from the edges of the seat 16 to further releasable secure the removable base 126 from the seed tray 10. For example, the inner diameter of the seat 16 can be configured to a close tolerance fit with the outer diameter of the removable base 126 for a loose friction fit to further assist with securing the seed tray 10 to the removable base 126. With the seed tray 10 installed, the feeder 100 can be hung from a bail wire 118 or be post-mounted to the female threads 160 in FIG. 11 and through aperture 24 in the seed tray 10 without affecting the operation or effectiveness of the seed tray 10.

Figure 11:
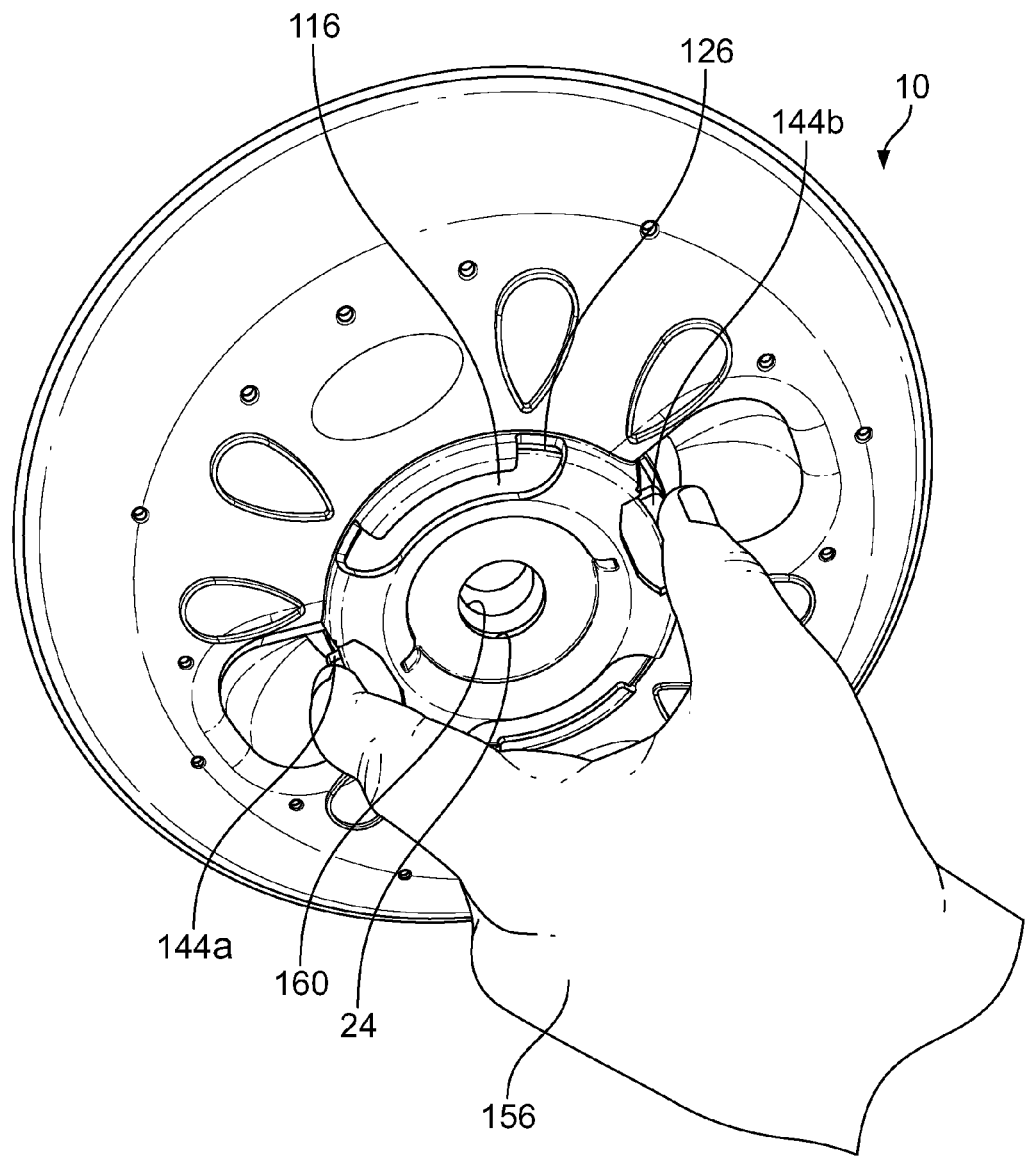
FIG. 11 shows removable of the removable base from the bird feeder tubular body while the seed tray is still attached to the removable base.
Figure 12:
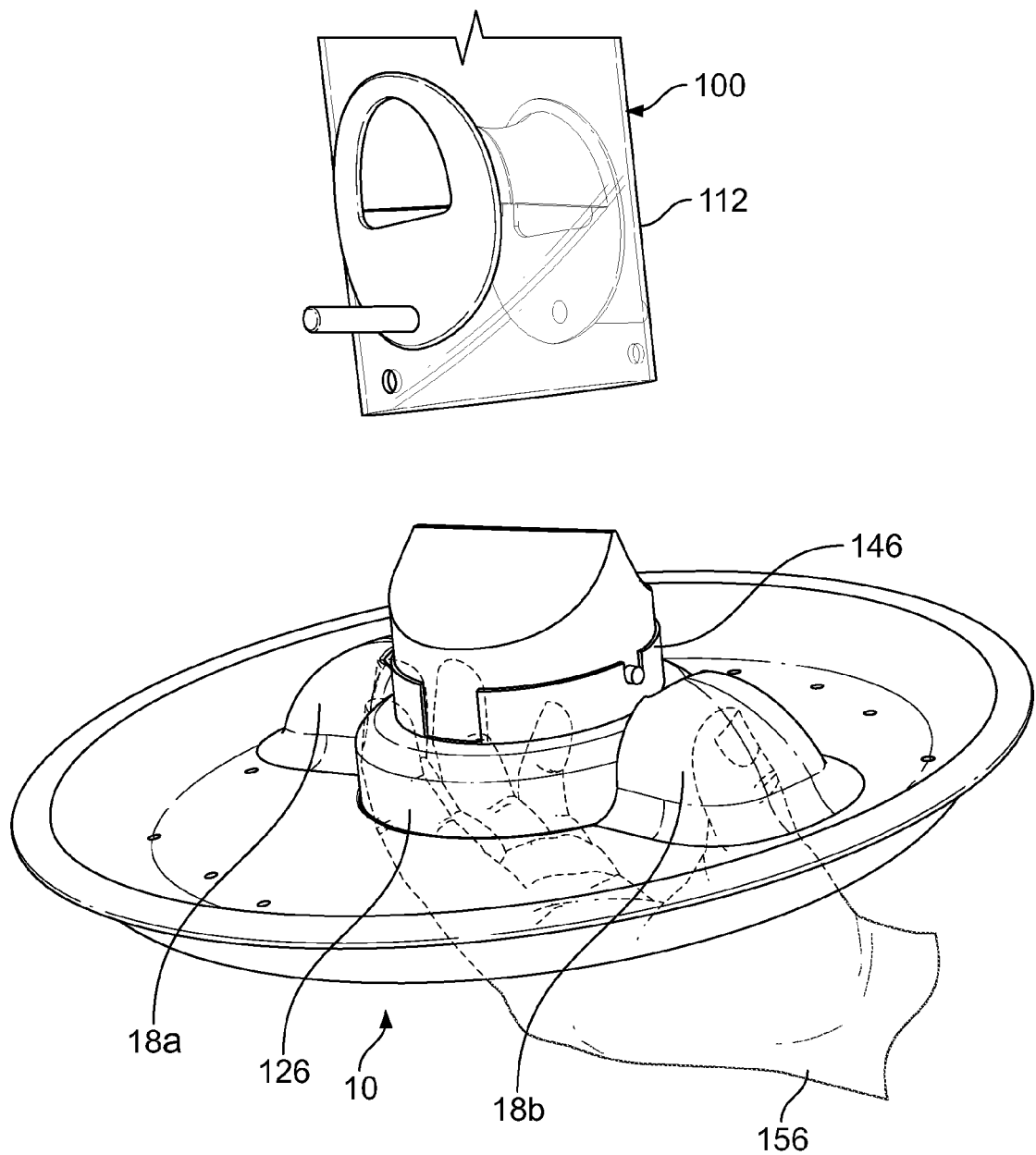
FIG. 12 shows the removable base and seed tray being detached from the bird feeder tubular body.

FIGS. 11 and 12 show removal of the removable base 126 and seed tray 10 attached thereto for cleaning and the like. In FIG. 11, the user 156 reaches with their fingers into the opposing bottom recesses of the dome-like members 18a and 18b to access the spring-biased buttons 144 residing therein. The user can freely depress the buttons 144 to release the corresponding locking pins 146, as in FIG. 7. When the locking pins 146 are clear of their respective apertures 124 in tubular body 112 of the feeder 100, the removable base 126 and the tubular body 112 can be separated form each other while the seed tray 10 of the present invention remains attached to the removable base 126 of the feeder 100. With the seed tray 10 of the present invention, the removable base 126 can be freely attached and removed from the tubular body 112 of the feeder 100.

The seed tray 10 of the present invention can also be removed from the removable base 126 of the feeder, if needed. Once the seed tray 10 and removable base 126 are separated from the tubular body 112, as in FIG. 12, the buttons 144a and 144b can remain depressed to permit the buttons 144a and 144b to clear from their respective lateral apertures 20a and 20b and permit the removable base 126 to be lifted out of its seat 16 on the top surface of the floor 12 of the seed tray 10 of the present invention. This is, essentially, the reverse of the process shown in FIG. 9.

The seed tray of the present invention is preferably made of plastic but could be made out of other materials, such as metal.

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A seed tray for a bird feeder having a main body and a removable base with at least one release button, comprising:
    a floor having a peripheral edge;
    an upstanding wall connected to the peripheral edge;
    a portion of the floor receiving a removable base of a bird feeder;
    at least one dome-like member positioned on the floor with a bottom open end and at least one lateral aperture;
    the at least one lateral the aperture respectively receiving at least one release button of a removable base of a bird feeder to effectuate removal of the removable base from a main body of a bird feeder;
    the bottom open end of the at least one dome-like member enabling manipulation of the at least one release button by fingers of a user to effectuate removal of the removable base from the main body of the bird feeder.

2. The seed tray of claim 1, wherein the at least one dome-like member defines a chamfered surface to respectively facilitate introduction of the at least one button of the removable base of the bird feeder base into the at least one lateral aperture.

3. The seed tray of claim 1, wherein the portion of the floor includes a seat to receive the removable base of a bird feeder.

4. The seed tray of claim 3, wherein the seat includes retention structure to assist in retaining the removable base in the seat.

5. The seed tray of claim 1, wherein the upstanding wall is curved.

6. The seed tray of claim 1, wherein the seed tray is made of plastic.

* * * * *